United States Patent
Cheng et al.

(10) Patent No.: US 12,409,423 B2
(45) Date of Patent: Sep. 9, 2025

(54) POROUS POLYETHYLENE FILTER MEMBRANE WITH ASYMMETRIC PORE STRUCTURE, AND RELATED FILTERS AND METHODS

(71) Applicant: ENTEGRIS, INC., Billerica, MA (US)

(72) Inventors: Kwok-Shun Cheng, Nashua, NH (US); Rajni Patel, Tewksbury, MA (US); Maybelle Woo, Dedham, MA (US); Puth Proeung, Lowell, MA (US)

(73) Assignee: ENTEGRIS, INC., Billerica, MA (US)

( * ) Notice: Subject to any disclaimer, the term of this patent is extended or adjusted under 35 U.S.C. 154(b) by 0 days.

(21) Appl. No.: 18/237,327

(22) Filed: Aug. 23, 2023

(65) Prior Publication Data

US 2023/0390709 A1    Dec. 7, 2023

Related U.S. Application Data

(62) Division of application No. 16/595,954, filed on Oct. 8, 2019, now abandoned.

(60) Provisional application No. 62/754,301, filed on Nov. 1, 2018.

(51) Int. Cl.
| | |
|---|---|
| *B01D 67/00* | (2006.01) |
| *B01D 69/02* | (2006.01) |
| *B01D 71/26* | (2006.01) |
| *C07B 63/00* | (2006.01) |

(Continued)

(52) U.S. Cl.
CPC ......... *B01D 71/261* (2022.08); *B01D 67/002* (2013.01); *B01D 69/02* (2013.01); *C07B 63/00* (2013.01); *B01D 63/14* (2013.01); *B01D 2325/0233* (2022.08); *B01D 2325/04* (2013.01)

(58) Field of Classification Search
None
See application file for complete search history.

(56) References Cited

U.S. PATENT DOCUMENTS

| | | |
|---|---|---|
| 4,247,498 A | 1/1981 | Castro |
| 4,743,375 A | 5/1988 | Seita et al. |

(Continued)

FOREIGN PATENT DOCUMENTS

| | | |
|---|---|---|
| CN | 101223217 B | 2/2013 |
| EP | 0408046 B1 | 10/1995 |

(Continued)

OTHER PUBLICATIONS

Sterlitech, Filtration Resources, Published online Aug. 9, 2018; Accessed online Jun. 10, 2024; https://www.sterlitech.com/blog/post/advantages-of-asymmetric-membranes (Year: 2018).*

(Continued)

*Primary Examiner* — Allison G Fitzsimmons

(57) ABSTRACT

Described are liquid-flowable, porous polyethylene filter membranes that include two opposing sides and that have an asymmetric pore structure; filter components and filters that include this type of porous polyethylene filter membrane; methods of making the porous polyethylene filter membranes, filter components, and filters; and methods of using a porous polyethylene filter membrane, filter component, or filter, to filter a fluid such as a liquid chemical to remove unwanted material from the fluid.

8 Claims, 3 Drawing Sheets

(51) Int. Cl.
*B01D 63/14* (2006.01)
*B01D 69/00* (2006.01)

(56) References Cited

U.S. PATENT DOCUMENTS

| | | | |
|---|---|---|---|
| 4,828,772 A * | 5/1989 | Lopatin | B01D 71/261 264/DIG. 48 |
| 6,375,876 B1 | 4/2002 | Kessler et al. | |
| 6,497,752 B1 | 12/2002 | Kessler et al. | |
| 7,429,343 B2 | 9/2008 | Kessler et al. | |
| 10,010,835 B2 | 7/2018 | Cho et al. | |
| 2003/0126988 A1 | 7/2003 | Nelson et al. | |
| 2003/0140789 A1 | 7/2003 | Koros et al. | |
| 2004/0050791 A1 | 3/2004 | Herczeg | |
| 2008/0020192 A1* | 1/2008 | Yen | B29C 48/307 264/45.9 |
| 2009/0159526 A1 | 6/2009 | Okada et al. | |
| 2010/0295511 A1 | 11/2010 | Kikuchi et al. | |
| 2011/0120935 A1 | 5/2011 | Ishizuka et al. | |
| 2013/0083528 A1 | 4/2013 | Huang et al. | |
| 2014/0339722 A1 | 11/2014 | Yen et al. | |
| 2017/0266626 A1 | 9/2017 | Kayama et al. | |
| 2018/0043656 A1 | 2/2018 | Song et al. | |
| 2018/0154314 A1 | 6/2018 | Na et al. | |

FOREIGN PATENT DOCUMENTS

| | | |
|---|---|---|
| EP | 2832781 B1 | 12/2017 |
| JP | 59203607 A | 11/1984 |
| JP | 62254806 A | 11/1987 |
| JP | 03080923 A | 4/1991 |
| JP | 08117567 A | 5/1996 |
| JP | 2001157827 A | 6/2001 |
| JP | 2001190940 A | 7/2001 |
| JP | 2003201398 A | 7/2003 |
| JP | 2009172477 A | 8/2009 |
| JP | 2012025904 A | 2/2012 |
| JP | 2014514158 A | 6/2014 |
| KR | 20160049492 A | 5/2016 |
| WO | 2010120668 A1 | 10/2010 |
| WO | 2014181762 A1 | 11/2014 |
| WO | 2015156403 A1 | 10/2015 |
| WO | 2016081729 A1 | 5/2016 |

OTHER PUBLICATIONS

Fu Sheng Sheng et al: Ce(III) recovery by supported liquid membrane using polyethylene hollow fiber prepared via thermally induced phase separation, Separation and Purification Technology, vol. 36, No. 1, Apr. 1, 2004 (Apr. 1, 2004), pp. 17-22, XP055934879, NL ISSN: 1383-5866, DOI: 10.1016/S1383-5866(03)00147-3.

Lloyd, D.; Microporous membrane formation via thermally-induced phase separation. II, Liquid-liquid phase separation; Journal of Membrane Science, 64 (1991), pp. 1-11.

Manickam et al., Pore structure characterization of asymmetric membranes: Non-destructive characterization of porosity and tortuosity, Journal of Membrane Science, 454 (2014) 549-554 (Year: 2014).

Matsuyama H et al: Formation of hydrophilic microporous membranes via thermally induced phase separation, Journal of Membrane Science, Elsevier BV, NL, vol. 142, No. 2, May 13, 1998 (May 13, 1998), pp. 213-224, XP004121288, ISSN: 0376-7388, DOI: 10.1016/50376-7388(97)00330-X.

Matsuyama H et al: Preparation of polyethylene hollow fiber membrane via thermally induced phase separation, Journal of Membrane Science, Elsevier BV, NL, vol. 223, No. 1-2, Sep. 15, 2003 (Sep. 15, 2003), pp. 119-126, XP004463142, ISSN: 0376-7388, DOI: 10.1016/S0376-7388(03)00314-4.

Posch, Polyolefins, Applied Plastics Engineering Handbook, Processing, Materials, and Applications, Second Edition, Elsevier, ISBN: 978-0-323-39040-8, Chapter 2, pp. 27-53. (Year: 2017).

Wang Jianli et al: Rheology behavior of high-density polyethylene/diluent blends and fabrication of hollow-fiber membranes via thermally induced phase separation, Journal of Applied Polymer Science, vol. 118, No. 4, Jan. 1, 2010 (Jan. 1, 2010), pp. n/a-n/a, XP055934890, US ISSN: 0021-8995, DOI: 10.1002/app.32584.

Lloyd et al., Microporous Membrane Formation Via Thermally Induced Phase Separation. I. Solid-Liquid Phase Separation, Journal of Membrane Science, vol. 52, No. 3, pp. 239-261, 1990.

* cited by examiner

POROUS POLYETHYLENE FILTER MEMBRANE WITH ASYMMETRIC PORE STRUCTURE, AND RELATED FILTERS AND METHODS

This application is a divisional under 35 U.S.C. § 120 of U.S. patent application Ser. No. 16/595,954 filed on Oct. 8, 2019, and entitled "POROUS POLYETHYLENE FILTER MEMBRANE WITH ASYMMETRIC PORE STRUCTURE, AND RELATED FILTERS AND METHODS," which claims the benefit of U.S. Application No. 62/754,301 filed on Nov. 1, 2018, all of which is hereby incorporated by reference in its entirety.

FIELD OF THE INVENTION

The following description relates to liquid-flowable, porous polyethylene filter membranes that include two opposing sides and that have an asymmetric pore structure; additionally to filter components and filters that include this type of porous polyethylene filter membrane; to methods of making the porous polyethylene filter membranes, filter components, and filters; and to methods of using a porous polyethylene filter membrane, filter component, or filter, to filter a fluid such as a liquid chemical to remove unwanted material from the fluid.

BACKGROUND

Filter membranes and filter products are indispensable tools of modern industry, used to remove unwanted materials from a flow of a useful fluid. Useful fluids that are processed using filters include water, liquid industrial solvents and processing fluids, industrial gases used for manufacturing (e.g., in semiconductor fabrication), and liquids that have medical or pharmaceutical uses. Unwanted materials that are removed from fluids include impurities and contaminants such as particles, microorganisms, volatile organic materials, and chemical species dissolved in a liquid.

A filter membrane may be designed for filtering a liquid, or for filtering a gas. A filter membrane for filtering a liquid material is structurally different from those used in filtering a gaseous fluid. Filter membranes that are used for filtering a liquid on a commercial or industrial scale will have pore sizes and porosity that are effective to allow for a useful level of flow (e.g., flux) of a liquid through the filter, meaning a level of flow that reliably supplies a needed amount of the liquid to a commercial system that uses the liquid, such as a tool used in semiconductor manufacturing. Filter membranes that are used for processing (filtering) a liquid are referred to as "liquid-flow" or "liquid-flowable" filter membranes. In a liquid-flow filter membrane, the size of the pores of the membrane is large enough to allow a level of flow of liquid (e.g., as described by a flux) through the filter membrane that is sufficient to meet the needs of a commercial system using the liquid.

In contrast, a filter membrane that is effective for use to filter a flow of gaseous fluid (a "gaseous-flow membrane") is not necessarily or typically "liquid-flowable," because the size of the pores of the gaseous-flow membrane must be on a smaller scale for the filter to be effective in removing contaminants from a flow of a gaseous fluid.

Within a wide range of pore sizes and structures, a pore size and structure for a particular filter may be selected based on various factors, including the type of filtration process for which a porous filter membrane will be used. For liquid-flowable filter membranes, some example pore sizes are in the micron or sub-micron range, such as from about 0.001 micron to about 10 microns. Membranes with average pore size of from about 0.001 to about 0.05 micron are sometimes classified as ultrafiltration membranes. Membranes with pore sizes between about 0.05 and 10 microns are sometimes classified as microporous membranes.

Many different polymer materials have been used for making liquid-flowable filter membranes, including certain types of polyolefins, polyhaloolefins, polyesters, polyimides, polyetherimides, polysulfones, and polyamides (e.g., nylons). One example of a common material is ultra high molecular weight polyethylene (UPE), which is generally understood to include polyethylene materials having a molecular weight of greater than 1,000,000. UPE filter membranes are commonly used for filtering liquid materials used in photolithography processing and "wet etch and clean" (WEC) applications for semiconductor processing.

Many different techniques are known for forming porous filter membranes that may be either gaseous-flow membranes or liquid-flow membranes. Example techniques include melt-extrusion (e.g., melt-casting) techniques and immersion casting (phase inversion) techniques, among others. The different techniques for forming a porous material can often produce different porous membrane structures in terms of the size and distribution of pores that are formed within the membrane, i.e., different techniques produce different pore sizes and membrane structures, sometimes referred to as morphology, meaning the uniformity, shape, and distribution of pores within a membrane.

Examples of membrane morphologies include homogeneous (isotropic) and asymmetric (anisotropic). A membrane that has pores of substantially uniform size uniformly distributed throughout the membrane is often referred to as isotropic, or "homogeneous." An anisotropic (a.k.a., "asymmetric") membrane may be considered to have a morphology in which a pore size gradient exists across the membrane; for example, the membrane may have a porous structure with relatively larger pores at one membrane surface, and relatively smaller pores at the other membrane surface with the pore structure varying along the thickness of the membrane. The term "asymmetric" is often used interchangeably with the term "anisotropic."

U.S. Pat. No. 6,479,752 (Kessler et al.) titled "Integrally Asymmetrical Polyolefin Membrane," shows asymmetric membranes that are "suited for gas exchange," e.g., "permit high gas exchange capacity" and "are impervious at least over extended periods of time to a breakthrough of hydrophilic liquids, in particular blood plasma." See also U.S. Pat. No. 7,429,343 (Kessler et al.) titled "Process for Producing Polyolefin Membrane with Integrally Asymmetrical Structure" and U.S. Pat. No. 6,375,876 (Kessler et al.) titled "Method for Producing an Integrally Asymmetrical Polyolefin Membrane." In comparison, U.S. Pat. No. 4,247,498 (Castro) titled "Methods for Making Microporous Products" describes films (made by liquid-liquid phase separation) that are said to be characterized by "relatively homogeneous, three-dimensional cellular structures"; example films are said to be "isotropic, and thus have essentially the same cross-sectional configuration when analyzed along any spatial plane."

SUMMARY

The field of microelectronic device processing (e.g., microelectronic and semiconductor device fabrication) requires steady improvements in processing materials and methods, to sustain parallel steady improvements in the performance (e.g., speed and reliability) of microelectronic devices. Opportunities to improve microelectronic device fabrication exist in all aspects of the manufacturing process, including methods and systems for filtering liquid materials used during fabrication.

A large range of different types of liquid materials are used in microelectronic device fabrication, for example as liquid solvents, gaseous materials (gaseous reagents, dopants, deposition materials, and precursors), liquid cleaning agents, and liquid reagents for processes such as photolithography. Many or most of these materials are used at very high levels of purity. As an example, liquid materials (e.g., solvents) used in photolithography processing of microelectronic devices must be of very high purity. To provide these liquid materials at a high level of purity for use in microelectronic device processing, a filtering system must be highly effective to remove various contaminants and impurities from the liquid, must be stable (i.e., not degrade or introduce contaminants) in the presence of the liquid material being filtered (e.g., an acidic material), and must be capable of supplying a useful volume of purified liquid flow through the filter.

A filter used to supply a flow of purified (filtered) liquid will contain a porous filter membrane that is said to be "liquid-flowable." The liquid-flowable filter membrane allows for a useful volume of liquid flow through the membrane. The filter membrane must also have good filtering properties as can be measured in one manner as "retention."

Past versions of porous polymeric filter membranes made for filtering liquids (i.e., "liquid-flowable" membranes) include membranes made of ultrahigh molecular weight polyethylene ("UPE," generally considered to have a molecular weight of at least 1,000,000 grams per mole (g/mol), which can be formed by melt-casting (extrusion) the UPE polymer into membranes that exhibit a combination of good liquid flow properties with good filtering performance as measured by retention. However, continued performance improvements are needed, as requirements for semiconductor processing become more stringent. Improving the retention of UPE membranes, such as by reducing pore size of a membrane, has become very difficult because as pore size is continually decreased, further decreases in pore size become more difficult to achieve without causing an unacceptable increase in flow time (a reduction in flow rate) of liquid through the membrane. Often, by reducing pore size, retention may stay the same but flow rate decreases.

As presented herein, Applicant has recognized that useful or better-performing filter membranes may be prepared from polyethylene polymers selected based on density, including (but not only) those sometimes referred to as "high density" polyethylene or "HDPE." The filter membrane may be used to filter (i.e., remove material from) a liquid used, at a high purity level, in a commercial or industrial process. The process may be any that requires a high purity liquid material as an input, with non-limiting examples of such processes including processes of preparing microelectronic or semiconductor devices, a specific example of which is a method of filtering a liquid process material (e.g., solvent or solvent-containing liquid) used for semiconductor photolithography or cleaning and etching processes. Examples of contaminants present in a process liquid or solvent used for preparing microelectronic or semiconductor devices may include metal ions dissolved in the liquid, solid particulates suspended in the liquid, and gelled or coagulated materials (e.g., generated during photolithography) present in the liquid.

In one aspect the invention relates to a liquid-flowable porous filter membrane that includes polyethylene having two opposed sides and a thickness between the two opposed sides, with pores throughout the thickness, and with the pores having an asymmetric pore structure.

In another aspect the invention relates to a method of preparing a porous polyethylene film having two opposed sides and a thickness between the two opposed sides, with pores throughout the thickness, and with the pores having an asymmetric pore structure. The method includes: extruding heated polymer solution comprising polyethylene polymer and solvent, at an extrusion temperature, to form extruded polymer film; and reducing the temperature of the extruded polymer film to form the cast porous polyethylene film.

DETAILED DESCRIPTION

Figure 1:
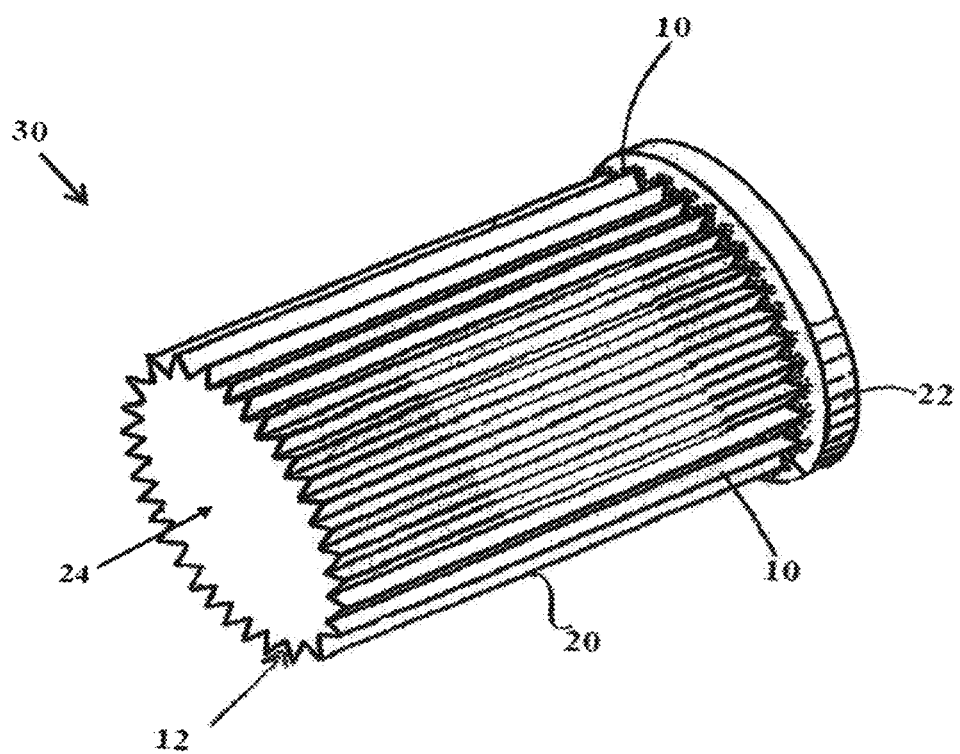
FIG. 1 is a side perspective view of an exemplary filter component of the present description.

The following description relates to liquid-flowable, porous polyethylene filter membranes that have an asymmetric pore structure. The description also relates to methods of making these filter membranes, products such as filter components and filters that contain the described filter membrane, and methods of using the liquid-flowable, porous polyethylene filter membrane or a component or filter that includes the filter membrane.

In brief, Applicant has identified novel and inventive porous filter membranes made using polyethylene, that exhibit an asymmetric pore structure and that are liquid-flowable with good filtering performance properties as measured by "retention." The filter membranes can be made using polyethylene that has a molecular weight in a range from 50,000 to 3,000,000 grams per mole (g/mol). The polyethylene can have a density that is considered to be relatively high as compared to a range of densities available for polyethylene materials; for purposes of this description, polyethylene materials that exhibit a "relatively high density" include polyethylene polymers that are sometimes referred to as "high density polyethylene" or "HDPE," but can also include polyethylene polymers that may not be within the meaning of these terms.

The described filter membranes are "liquid-flowable." As will be appreciated by the person of ordinary skill in the filter membrane arts, a liquid-flowable filter membrane is a type of membrane that can be used for filtering a flow of a liquid fluid to remove undesired material (e.g., contaminants or impurities) from the liquid, to thereby produce a high purity liquid. A "liquid-flowable" porous filter membrane is a filter membrane that is sufficiently porous to allow liquid to flow through the filter membrane in an amount (i.e., volume per area of the filter and at a practical pressure differential) that will allow the filter membrane to perform a filtering function relative to the liquid fluid. The liquid-flowable porous filter membrane allows for more than mere liquid permeability of liquid through the membrane. Thus, a porous filter membrane that is designed and effective for filtering a flow of a gaseous fluid, but that is not sufficiently porous to allow a flow of liquid fluid in an amount (volume) that would allow the membrane to be practically useful as a filter for a liquid fluid, is not considered to be "liquid-flowable."

Example liquid-flowable porous ("open pore") filter membranes can be in the form of a thin film or sheet-type membrane that includes two opposed sides and a thickness between the two sides. Between the two opposed surfaces, along the thickness of the membrane, are cellular, three-dimensional, void microstructures in the form of enclosed cells, i.e., "open cells," to allow for fluid to pass through the thickness of the membrane. The open cells can be referred to as openings, pores, channels, or passageways, which are largely interconnected between adjacent cells to allow liquid fluid to flow through the thickness of the membrane.

Figure 2A:
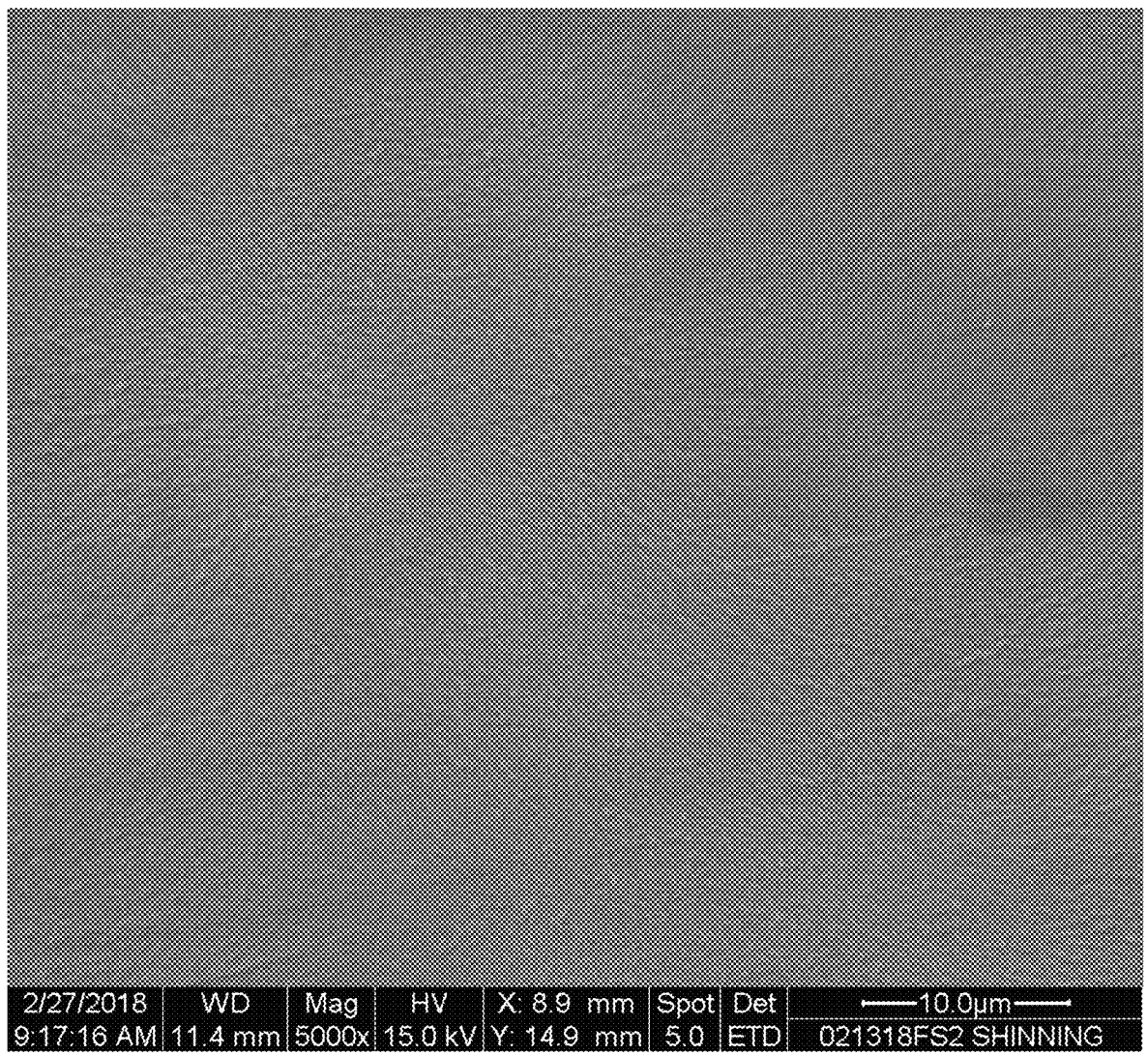
FIG. 2A is a surface view of the tight side of an exemplary membrane taken by a scanning electron microscope (SEM) at a magnification of 5,000.
Figure 2B:
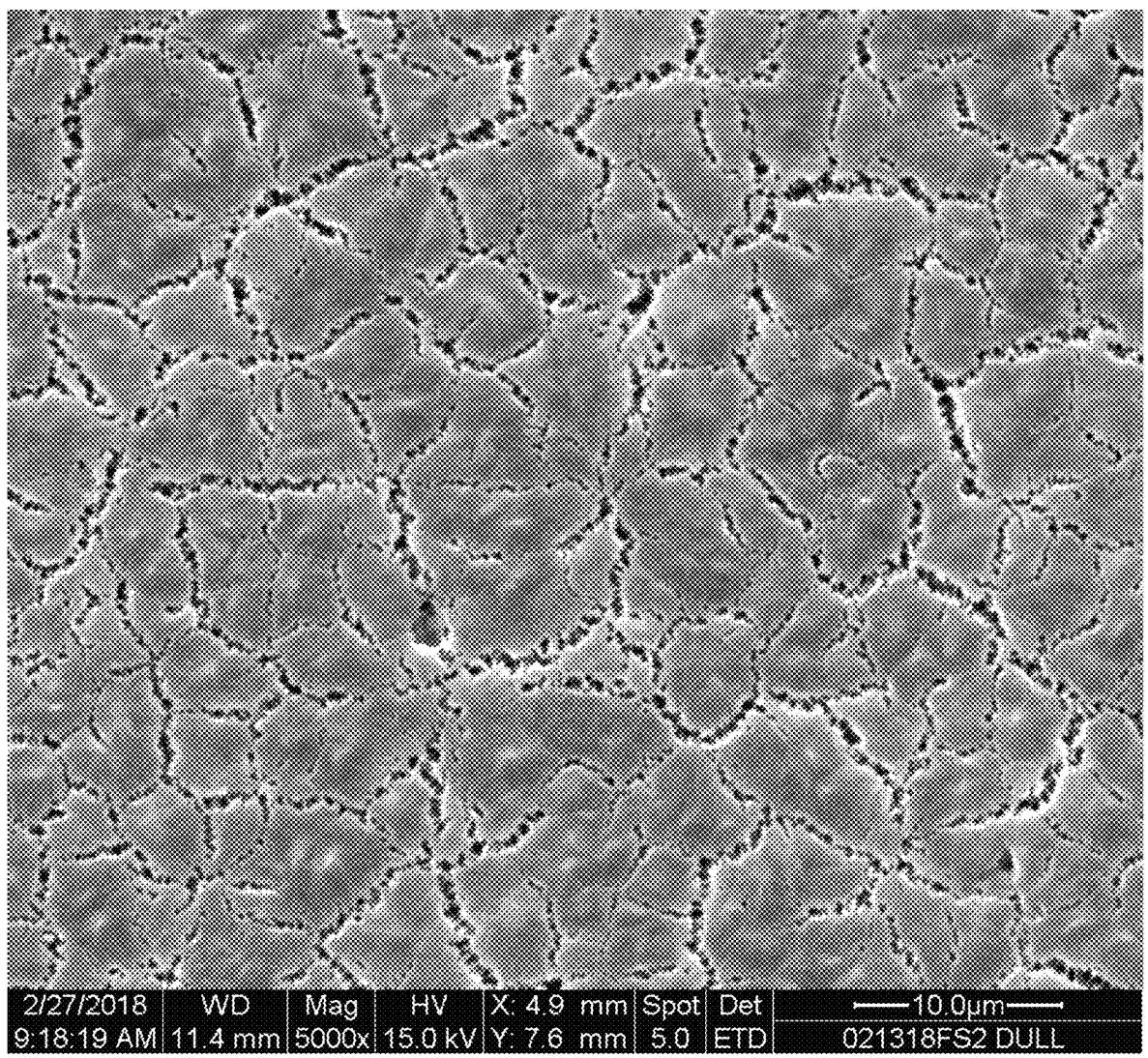
FIG. 2B is a surface view of the open side of an exemplary membrane taken by a SEM at a magnification of 5,000.

The pores are distributed throughout the thickness of the membrane and are arranged to exhibit an asymmetric pore structure. Within the context of the present description, an "asymmetric" membrane is one that includes pores of different sizes on the two sides of the membrane. The asymmetric membrane includes a first side (sometimes referred to as a "tight" side or a "retentive" side) that includes relatively smaller pores, as shown for example in FIG. 2A, and a second side (an "open" side or a "support" side) that includes relatively larger pores, as shown for example in FIG. 2B. In between the two sides, the membrane includes pores of gradually-changing intermediate sizes.

The entire thickness and both sides of the asymmetric membrane are formed from the same polymeric material, and are formed together as an integral membrane by a single formation step. Thus, the asymmetric membrane may be referred to as "integrally asymmetric." In contrast to integrally asymmetric membranes, other types of membranes, which may optionally be asymmetric, may be non-integral. Other membranes, sometimes referred to as multi-layer or "composite" membranes, have been prepared by combining or attaching two separate membrane layers that each have a different morphology. The composite membrane may include a multilayer structure formed by combining a first porous layer formed in one formation step and having a first (e.g., larger pore size) morphology, with a second porous layer formed in a second formation step that is different from the step of forming the first porous layer. This type of multi-layer or "composite" membrane structure formed by multiple steps is not considered to be an "integral" membrane or to be "integrally asymmetric."

An asymmetric membrane will allow for different flow properties of a liquid passing through the membrane, as the liquid passes through each of the two different sides (e.g., portions of the thickness) of the membrane. As such, each of the different sides of the asymmetric membrane can perform a separate function. The side (portion) of the membrane that includes smaller pores can be referred to as a "tight" side of the membrane. The tight side of the membrane will be the side that effectively limits the flow of liquid through the membrane, and that acts primarily as a filter to remove contaminants or other materials from a liquid flowing through the membrane. The other (second) side of the membrane, the side having larger pores, can be referred to as the "open" side of the filter. The open side has a much lower effect on flow relative to the tight side, i.e., does not substantially restrict flow of a liquid to a level that compares to the flow-restricting effect of the tight side. The open side provides structural or mechanical support for the tight side and is not required to perform a filtering function by removing contaminants or other materials from a liquid that flows through the membrane but in various embodiments may be capable of providing filtering function.

An asymmetric membrane as described is considered to differ structurally from membranes that have other types of morphologies, such as filter membranes that are considered to have an "isotropic" or "homogeneous" morphology. For example, the presently-described asymmetric membranes differ from homogeneous and isotropic membranes, such as the relatively homogeneous filter membranes described in U.S. Pat. No. 4,247,498 (Castro) titled "Methods for Making Microporous Products," which are described as "isotropic," having essentially the same cross-sectional configuration when analyzed along any spatial plane."

An "asymmetric" filter membrane can be identified objectively, by at least one test method, referred to as the "oil drop test." By this test, a drop of mineral oil is placed on one side of a sample filter membrane and, for comparison, one drop is placed on a second side of a second membrane. For testing as described herein the drop of mineral oil has a volume of 1 microliter (1 µL), and the mineral oil is the commercially available Britol 35, which has a specific gravity (25° C.) in a range of 0.855 to 0.880 and a reported kinematic viscosity at 40° C. of 65-70 cSt. The amount of time for the drop to spread to a diameter equal to 1 centimeter is measured. On an asymmetric membrane, the amount of time required for the drop to reach the specified diameter will be more than insignificantly different from one side to the other. On an asymmetrical membrane, the drop will spread more quickly on the side with larger pores and less quickly on the side with smaller pores. In specific example asymmetrical membranes, a drop of mineral oil placed on the first (tight, smaller pore) side spreads to a diameter of 1 centimeter in a time that is at least 4 times, e.g., at least 6 times, longer than the time taken for a same-sized drop of the same mineral oil placed on the open (larger pore) side to reach the same diameter. An example of an amount of time for the drop of oil to spread to 1 centimeter on the tight side is a time in a range from 5 to 20 seconds; an example of an amount of time for the drop of oil to spread to 1 centimeter on the open side is a time in a range from 20 to 120 seconds.

In addition to being liquid-flowable and having an asymmetric pore structure, the described filter membranes can also be characterized by features that include a preferred bubble point and preferred thickness, and can be made from polymer that includes polyethylene having a desired density (within a range) and molecular weight (within a range).

Bubble point is also an understood property of porous filter membranes. By a bubble point test method, a sample of porous filter membrane is immersed in and wetted with a liquid having a known surface tension, and a gas pressure is applied to one side of the sample. The gas pressure is gradually increased. The minimum pressure at which the gas flows through the sample is called a bubble point. Examples of useful mean bubble points of a porous filter membrane as described, measured using the test method described in the Examples section herein, can be in a range from 2 to 400 psi, e.g., in a range from 135 to 185 psi.

An asymmetric filter membrane as described will have larger pores on an "open" side of the membrane and smaller pores on a "tight" side of the membrane. The size and number of the pores on the tight side will be effectively determinative of a flow rate of liquid fluid through the membrane, and pore size correlates directly to bubble point. The size of those pores may not always be measurable directly, but can be evaluated in size based on the bubble point of the membrane. The pore size can be calculated from the bubble point using the following equation:

$$d_p = \frac{4\gamma\cos\theta}{p}$$

where $d_p$=diameter of the pore,
$\gamma$=surface tension of the wetting fluid,
p=bubble point,
$\theta$=contact angle between the wetting fluid and the surface of the pore.

On this basis, certain preferred filter membranes of the present description may have pores on a tight side of the filter membrane that have an average pore size (diameter, as evaluated based on a correlation with bubble point) in a range from 0.001 to 0.2 microns, e.g., from 0.001 to 0.1 or 0.05 microns.

A porous polymer filter membrane as described may have any porosity that will allow the porous polymer filter layer to be effective as described herein, for filtering a flow of liquid to produce a high purity filtered liquid. Example porous polymer filter layers can have a relatively high porosity, for example a porosity of up to 80 percent, e.g., a porosity in a range from 60 to 80, e.g., 60 to 70 percent. As used herein, and in the art of porous bodies, a "porosity" of a porous body (also sometimes referred to as void fraction) is a measure of the void (i.e. "empty") space in the body as a percent of the total volume of the body, and is calculated as a fraction of the volume of voids of the body over the total volume of the body. A body that has zero percent porosity is completely solid.

A porous polymeric filter layer as described can be in the form of a sheet having any useful thickness, e.g., a thickness in a range from 30 to 200 microns, e.g., from 100 or 120 to 180 microns.

The term "polyethylene" refers to a polymer that has, in part or substantially, a linear molecular structure of repeating —CH$_2$—CH$_2$— units. Polyethylene is normally a semi-crystalline polymer that elongates before breaking, enhancing its toughness. Polyethylene can be made by reacting monomer composition that includes monomers comprising, consisting of, or consisting essentially of ethylene monomers. Thus, a polyethylene polymer may be a polyethylene homopolymer prepared by reacting monomers that consist of or consist essentially of ethylene monomers. Alternatively, a polyethylene polymer may be a polyethylene copolymer prepared by reacting a combination of ethylene and non-ethylene monomers that include, consist of, or consist essentially of ethylene monomers in combination with another type of monomer such as another alpha-olefin monomer, e.g., butene, hexene, or octane, or a combination of these; for a polyethylene copolymer, the amount of ethylene monomer used to produce the copolymer, relative to non-ethylene monomers, can be any useful amount, such as an amount of at least 50, 60, 70, 80, or 90 percent (by weight) ethylene monomer per total weight of all monomers (ethylene monomer and non-ethylene monomer) in a monomer composition used to prepare the ethylene copolymer.

As used herein, a composition (e.g., monomer composition) that is described as "consisting essentially of" a certain ingredient or a combination of specified ingredients is a composition that contains the ingredient or combination of specified ingredients and not more than a small or insignificant amount of other materials, e.g., not more than 3, 2, 1, 0.5, 0.1, or 0.05 weight percent of any other ingredient or combination of ingredients. A monomer composition described as containing monomers that "consist essentially of" ethylene monomers is a monomer composition that contains ethylene monomers and not more than a small or insignificant amount of other monomeric materials, e.g., not more than 3, 2, 1, 0.5, 0.1, or 0.05 weight percent of any other monomers.

The liquid-flowable porous filter membrane is made of polymer that includes (e.g., comprises, consists essentially of, or consists of) polyethylene, which is a polymer that is commonly used for liquid-flowable porous filter membranes. Polyethylene polymers vary in properties such as molecular weight, density, and melt index. Polyethylene having a molecular weight that is substantially greater than 1,000,000 grams per mole (g/mol) is commonly referred to as UPE polymers, and may be useful as described. Likewise, polyethylene having a molecular weight below 1,000,000 can also be useful. Example polyethylene materials can have a molecular weight that is between 50,000 and 3,000,000 grams per mole (g/mol). Molecular weight of a polymer reported in grams per mole (g/mol) can be measured using known gel permeation chromatography (GPC) (also known as size-exclusion chromatography (SEC)) techniques and equipment. Alternately, molecular weight may be measured by a viscosity method.

Polyethylene, including polyethylene having a molecular weight within ranges as described herein, can exhibit a density that is within a range of densities available for polyethylene polymers. The density of a particular polyethylene polymer can depend on factors such as the structure and composition of the polymer, including the degree of branching of the polymer, which is based in large part on the types of non-ethylene monomers used to prepare the polymer. Polyethylene used to prepare a porous filter membrane of the present description can have any useful density, meaning any density that is capable of forming a filter membrane that is consistent with the present description. In certain examples, the polyethylene can be one that has a relatively higher density compared to other polyethylene materials, across a range of possible densities that may be available for polyethylene polymers.

Polyethylene materials generally can have a density that is below about 1.0 gram per cubic centimeter, for example a density in a range from 0.94 to 0.97 grams per cubic centimeter. Within this range, "low density polyethylene" (e.g., "linear low density polyethylene") is sometimes considered to have a density in a range from 0.91 to 0.925 grams per cubic centimeter. "Medium-density polyethylene" is sometimes considered to have a density in a range from 0.926 to 0.940 grams per cubic centimeter. "High density polyethylene" ("HDPE") is sometimes considered to have a density in a range from 0.941 to 0.965 grams per cubic centimeter. Disregarding these specific terms and density ranges as they are sometimes used to classify a high, low, or medium density polyethylene, a useful polyethylene for a filter membrane as described may have any effective density regardless of how it might fit into the nomenclature associated with these ranges. Still, a density in a range in the middle-to-high portion of the total range can be preferred, for example a density in a range from 0.94 to 0.97 grams per cubic centimeter, e.g., from 0.940 to 0.965 grams per cubic centimeter. The density of a polyethylene material as described refers to the density of a polyethylene material used to prepare the filter membrane, measured before the polyethylene is formed into the porous filter membrane.

Examples of useful or preferred polyethylene polymer can have a melt index in a range from 0.01 to 0.35 grams per ten minutes (g/10 min), measured using ASTM D1238-13.

Polyethylene used for preparing the filter membrane may be part of a polymeric composition that may comprise, consist of, or consist essentially of polyethylene raw materials or ingredients having one or more of a density as specified herein, a molecular weight as specified herein, and a melt index as specified herein, with preferred polyethylene polymers having all three. The polymer used to prepare the filter membrane may be a single type of polymeric material (e.g., a single raw material) or may be a blend of multiple different polymers which may include polymer that does not have a density, molecular weight, or melt index as described. If a blend, the density and flow index of the blend can preferably be in a range from 0.94 to 0.97 grams per cubic centimeter (e.g., from 0.940 to 0.965 grams per cubic centimeter) and from 0.01 to 0.35 (g/10 min), respectively.

In certain examples, the polymeric composition can include at least a major amount or a high percentage of polyethylene having a molecular weight as described (from 50,000 to 3,000,000 grams per mole), a density as described (in a range from 0.94 to 0.97 grams per cubic centimeter, e.g., from 0.940 to 0.965 grams per cubic centimeter), and a melt index as described (e.g., from 0.01 to 0.35 g/10 min); the polyethylene material can include at least 50, 60, 70, 80, or 90 percent by weight of this type of polymer based on total polymer in the polymeric composition (other ingredients, such as solvent, may also be included). In other examples the polymeric composition can include polymer that consists of or consists essentially of this type of polyethylene. A polymer composition that consists essentially of polyethylene having a molecular weight as described (from 50,000 to 3,000,000 grams per mole (g/mol)), a density as described (in a range from 0.94 to 0.97 grams per cubic centimeter, e.g., from 0.940 to 0.965 grams per cubic centimeter), and a melt index as described (e.g., from 0.01 to 0.35 g/10 min), refers to a polymer composition that contains polyethylene having these properties and not more than a small or insignificant amount of other types of polymer, e.g., not more than 3, 2, 1, 0.5, 0.1, or 0.05 weight percent of any other type of polymer based on total weight polymer in the polymer composition.

Example polyethylene compositions, if desired, may be made from (e.g., comprise, consist essentially of, or consist essentially) a blend of two or more polyethylene raw materials (polyethylene "ingredients") that have the same or different density or molecular weight. In such a blend, polyethylene of one or more raw materials may have a molecular weight, density, or melt index, that is outside of a range of a desired or preferred molecular weight as described, provided that: the density of the blend is as described herein, e.g., in a range from 0.93 to 0.97 grams per cubic centimeter; the melt index of the blend is as described herein, e.g., in a range from 0.01 to 0.35 grams per 10 minutes, or both. As an example, a useful blend of polyethylene raw materials may be prepared from (e.g., comprise, consist essentially of, or consist of): a polymer composition that contains a major amount (e.g., at least 50, 60 70, or 80, or 90 percent by weight) of polyethylene having a density in a range of 0.94 to 0.97 grams per cubic centimeter, a molecular weight of not more than 3,000,000, and a melt index in a range of 0.01 to 0.35 gram per ten minutes, in combination with a lower amount (e.g., below 50, 40, 30, 20 or 10 percent by weight) of polyethylene having a density, molecular weight, or melt index that is outside of the respective range, provided that the density of the blend is as described herein, e.g., in a range from 0.93 to 0.97 grams per cubic centimeter, and that the melt index is also as described, e.g., from 0.01 to 0.35 g/10 min.

A filter membrane as described can be useful to remove contaminants from a liquid by passing the liquid through the filter membrane to produce a filtered (or "purified") liquid. The filtered liquid will contain a reduced level of contaminants compared to the level of contaminants present in the liquid before the liquid is passed through the filter membrane.

A level of effectiveness of a filter membrane in removing contaminants from a liquid can be measured, in one fashion, as "retention." Retention, with reference to the effectiveness of a filter membrane, generally refers to a total amount of an impurity (actual or during a performance test) that is removed from a liquid that contains the impurity, relative to the total amount of the impurity that was in the liquid, upon passing the liquid through the filter membrane. The "retention" value of a filter membrane is, thus, a percentage, with a filter that has a higher retention value (a higher percentage) being relatively more effective in removing particles from a liquid, and a filter that has a lower retention value (a lower percentage) being relatively less effective in removing particles from a liquid.

A preferred filter of the present invention can have a very high measured retention value, e.g., at least 90, 95, 96, 98, or 99 percent, when tested as described in the Examples section, below.

The filter membrane, being liquid-flowable, is capable of having a flow of liquid pass through the membrane in an amount that is useful for commercial or industrial filtering applications. A useful flux can be at least 30 liters/square meter/hour/bar (LMH/bar), e.g., in a range from 40 to 100 LMH/bar, or from 50 to 80 LMH/bar, preferably while performing at a commercially level retention level such as at a retention level as described herein immediately above. These values can be calculated by an isopropanol permeability flow test as described in the Examples section below.

A process for preparing an asymmetric porous filter membrane as described can be a method sometimes referred to as an extrusion melt-cast process, or as "thermally-induced liquid-liquid phase separation." In this type of process, the polyethylene polymer is dissolved at elevated temperature ("extrusion temperature") in a combination of two or more solvents to form a heated polymer solution that can be processed and shaped, e.g., through an extruder. The heated polymer solution can be passed through an extruder and an extrusion die, to be shaped, such as into the form of a sheet-like membrane. The heated polymer solution is passed through the die and is dispensed onto a shaping surface that is at a temperature that is much lower than the extrusion temperature, i.e., a "cooling temperature." When the extruded, heated polymer solution contacts the lower-temperature shaping surface, the polymer and solvents of the heated polymer solution undergo one or more phase separations in a manner that causes the polymer to be formed into a porous filter membrane as described herein. Examples of comparable processes of producing porous polymeric shaped materials are described, for example, in U.S. Pat. No. 6,497,752, the entirety of which is incorporated herein by reference.

The heated polymer solution can be prepared to contain polyethylene (as described herein) dissolved in solvent that includes a first ("strong") solvent and a second ("weak") solvent. The polymer of the polymer solution may comprise, consist of, or consist essentially of the polyethylene as described herein, having desired or preferred properties of molecular weight, density, and melt index, as described.

The strong solvent is capable of substantially dissolving the polymer into the heated polymer solution. Examples of useful strong solvents include organic liquids in which polyethylene polymer as described herein is highly soluble at an extrusion temperature, and in which the polyethylene polymer has a low solubility at a cooling temperature. Examples of useful strong solvents include mineral oil and kerosene.

The weak solvent may also be capable of substantially dissolving the polymer into the heated polymer solution, though to a lesser degree than the strong solvent. It is miscible with the strong solvent. Particular examples of weak solvents include dioctyl phthalate, dibutyl sebacate (DBS), dioctyl sebacate, di-(2-ethylhexyl) adipate, dibutylphthalate, tetralin, n-decanol, 1-dodecanol, diphenylmethane, and mixtures thereof.

The amount of the polymer (e.g., polyethylene or polyethylene with one or more other polymers) in the heated polymer solution, relative to the amount of solvent, can be an amount that is sufficiently high to allow for the heated polymer solution to be processed by extrusion, through an extruder and a die, and that is sufficiently low to allow the polymer in the polymer solution to coalesce and form into a desired porous morphology upon casting and cooling. A useful or preferred amount of polymer as described herein that can be included in a heated polymer solution as described, and processed as described, can be in a range from 15 to 35 weight percent, or from 17 to 25 weight percent, based on total weight heated polymer solution. The balance of the heated polymer solution can be a combination of one or more weak solvents and one or more strong solvents. Thus, useful or preferred heated polymer solutions can contain, e.g., from 65 to 85 weight percent solvent (a combination of weak and strong solvents), e.g., from 75 to 83 weight percent solvent.

The relative amounts of strong solvent to weak solvent can be selected as desired, to achieve a desired pore structure of a porous membrane. A larger relative amount of strong solvent can produce a filter membrane having smaller pores. A larger relative amount of weak solvent can produce a filter membrane having larger pores. Useful relative amounts of strong solvent to weak solvent can vary within ranges that include (strong solvent:weak solvent) from 10:90 to 90:10, from 20:80 to 80:20, from 25:75 to 75:25, and from 40:60 to 60:40.

A useful process, in more detail, can be based on a thermally-induced phase separation process that includes liquid-liquid phase separation of the weak solvent and the strong solvent (with dissolved polymer). According to such methods, a heated polymer solution that contains polymer (comprising, consisting of, or consisting essentially of polyethylene as described) dissolved in strong solvent, additionally in combination with a second solvent (referred to as a "weak solvent" or even a "non-solvent" or "porogen"), forms a heated polymer solution. This heated polymer solution system is characterized as having: a range of temperatures at which the solution maintains a state of a homogeneous solution of the polymer dissolved in the combination of the strong solvent and the weak solvent, and a second (lower) range of temperatures at which the solution will become phase separated.

The rate of cooling the heated polymer solution can affect the pore structure being created. Varieties of such sponge-like microporous structures formed via processes with thermally induced liquid-liquid phase separation are described in Lloyd, Douglas R. et al, "Microporous membrane formation via thermally-induced phase separation. II. Liquid-liquid phase separation", Journal of Membrane Science, 64 (1991) 1-11.

The heated polymer solution formed from the polymer and the weak and strong solvents can be extruded, passed through an extrusion die, and shaped as desired, during a heated extrusion step. Many examples of useful extruding equipment are known and commercially available a single commercial example being the Leistritz 27 millimeter twin screw, co-rotating extruder. Conventional dies such as sheeting dies, casting molds, doctor blades, profiled dies, are also well known and will be understood to be useful according to the present description.

The extruded heated polymer solution can be cooled by contacting any shaping surface, such as a cooling roll or "chill roll."

A useful or preferred extrusion temperature, i.e., the temperature of the heated polymer solution exiting an extruder die, can be in a range from 180 to 250 degrees Celsius, e.g., from 195 to 220 degrees Celsius.

A useful or preferred cooling temperature, e.g., a temperature of a surface onto which the heated polymer solution is extruded, such as a surface chill roll, can be in a range from 10 to 50 degrees Celsius, e.g., from 25 to 40 degrees Celsius.

A filter membrane as described herein, or a filter or filter component that contains the filter membrane, can be useful in a method of filtering a liquid chemical material to purify or otherwise remove unwanted material from the liquid chemical material, especially to produce a highly pure liquid chemical material that is useful for an industrial process that requires chemical material input that has a very high level of purity. Generally, the liquid chemical may be any of various useful commercial materials, and may be a liquid chemical that is useful in any of a variety of different industrial or commercial applications. Particular examples of filter membranes as described can be used for purifying a liquid chemical that is used or useful in a semiconductor or microelectronic fabrication application, e.g., for filtering a liquid solvent or other process solution used in a method of semiconductor photolithography, a wet etching or cleaning step, a method of forming spin-on-glass (SOG), for a backside anti-reflective coating (BARC) method, etc.

Some specific, non-limiting, examples of liquid solvents that can be filtered using a filter membrane as described include: n-butyl acetate (nBA), isopropyl alcohol (IPA), 2-ethoxyethyl acetate (2EEA), cyclohexanone, ethyl lactate, gamma-butyrolactone, hexamethyldisilazane, methyl-2-hydroxyisobutyrate, methyl isobutyl carbinol (MIBC), n-butyl acetate, methyl isobutyl ketone (MIBK), isoamyl acetate, propylene glycol monoethyl ether, propylene glycol methyl ether (PGME), 2-heptanone, and propylene glycol monomethyl ether acetate (PGMEA).

The filter membrane can be contained within a larger filter structure such as a filter or a filter cartridge that is used in a filtering system. The filtering system will place the filter membrane, e.g., as part of a filter or filter cartridge, in a flow path of a liquid chemical to cause the liquid chemical to flow through the filter membrane so that the filter membrane is able to remove impurities and contaminants from the liquid chemical. The structure of a filter or filter cartridge may include one or more of various additional materials and structures that support the porous filter membrane within the filter to cause fluid to flow from a filter inlet, through the filter membrane, and thorough a filter outlet, thereby passing through the filter membrane when passing through the filter.

The filter membrane supported by the filter structure can be in any useful shape, e.g., a pleated cylinder, cylindrical pads, one or more non-pleated (flat) cylindrical sheets, a pleated sheet, among others.

One example of a filter structure that includes a filter membrane in the form of a pleated cylinder can be prepared to include the following component parts, any of which may be included in a filter construction but may not be required: a rigid or semi-rigid core that supports a pleated cylindrical coated filter membrane at an interior opening of the pleated cylindrical coated filter membrane; a rigid or semi-rigid cage that supports or surrounds an exterior of the pleated cylindrical coated filter membrane at an exterior of the filter membrane; optional end pieces or "pucks" that are situated at each of the two opposed ends of the pleated cylindrical coated filter membrane; and a filter housing that includes an inlet and an outlet. The filter housing can be of any useful and desired size, shape, and materials, and can preferably be made of suitable polymeric materials.

As one example, FIG. 1 shows filter component 30, which is a product of pleated cylindrical component 10 and end piece 22, with other optional components. Cylindrical component 10 includes a filter membrane 12, as described herein, and is pleated. End piece 22 is attached (e.g., "potted") to one end of cylindrical filter component 10. End piece 22 can preferably be made of a melt-processable polymeric material. A core (not shown) can be placed at the interior opening 24 of pleated cylindrical component 10, and a cage (not shown) can be placed about the exterior of pleated cylindrical component 10. A second end piece (not shown) can be attached ("potted") to the second end of pleated cylindrical component 30. The resultant pleated cylindrical component 30 with two opposed potted ends and optional core and cage can then be placed into a filter housing that includes an inlet and an outlet and that is configured so that an entire amount of a fluid entering the inlet must necessarily pass through filtration membrane 12 before exiting the filter at the outlet.

The filter housing can be of any useful and desired size, shape, and materials, and can preferably be a fluorinated or non-fluorinated polymer such as nylon, polyethylene, or fluorinated polymer such as a poly(tetrafluoroethylene-co-perfluoro(alkylvinylether)), TEFLON® perfluoroalkoxyalkane (PFA), perfluoromethylalkoxy (MFA), or another suitable fluoropolymer (e.g., perfluoropolymer).

EXAMPLES

The following table shows performance data from two inventive filter membranes (Examples 1 and 2) made of HDPE, and a comparison of that performance data to non-inventive membranes (Comparison 1, 2, and 3).

| Example | Flow (LMH/bar) | Bubble Point | Thickness (micron) | Retention (percent, monolayer) | | | |
|---|---|---|---|---|---|---|---|
| | | | | 0.5 | 1 | 2 | 3 |
| 1 | 57 | 175 | 159 | 100 | 100 | 95 | 76 |
| 2 | 95 | 140 | 110 | 99 | 98 | 84 | 62 |
| Comp 1 | 53 | 160 | 55 | 93 | 90 | 71 | — |
| Comp 2 | 147 | 120 | 55 | 94 | 87 | 58 | 46 |
| Comp 3 | 59 | 230 | 10 | 91 | 73 | 55 | 50 |

Comparative 1 is a commercially available UPE filter with 1 nanometer nominal pore size (Entegris Impact 8G 1 nm UPE). Comparative 2 is a commercially available UPE filter with 3 nanometer nominal pore size (Entegris Microgard 3 nm UPE UC). Comparative 3 is a commercially available filter with a nominal 2 nanometer pore size (Pall Kleen 2 nm HDPE).

The tests for data of these Examples were performed as follows:

Bubble Point Test

To measure the HFE (hydrofluoroether) mean bubble point, a 47 mm membrane disc is placed in a holder with the open pore (larger pore size) side facing upstream, and a highly permeable spunbonded nonwoven (PGI Inc.) is placed on the downstream as a support layer. Air is pressurized through the holder and measured as a function of pressure. A low surface tension fluid, with ethoxy-nonafluorobutane (HFE-7200) available from 3M is then introduced to the downstream side to wet the membrane. Air is pressurized through the holder again, and the air flow is measured as a function of pressure. The mean bubble point is the pressure at which the ratio of the air flow of the wet membrane to the air flow of the dry membrane is 0.5. The test is performed at ambient temperature (e.g., 20-25 degrees Celsius).

Retention Test

"Particle retention" or "coverage" refers to the percentage of the number of particles that can be removed from a fluid stream by a membrane placed in the fluid pathway of the fluid stream. Particle retention of a 47 mm membrane disc can be measured by passing a sufficient amount of an aqueous feed solution of 0.1% Triton X-100, containing 8 ppm polystyrene particles having a nominal diameter of 0.03 microns (available from Duke Scientific G25B), to achieve 1% monolayer coverage through a membrane at a constant flow of 7 mL/min, and collecting the permeate. The concentration of the polystyrene particles in the permeate can be calculated from the absorbance of the permeate. Particle retention is then calculated using the following equation:

$$particle\ retention = \frac{[feed] - [filtrate]}{[feed]} \times 100\%.$$

The number (#) of particles necessary to achieve 1% monolayer coverage can be calculated from the following equation:

$$\#\ of\ particles\ for\ 1\%\ monolayer = \frac{a}{\frac{\sqrt{3}}{2}d_p^2} \times \frac{1}{100}$$

where
  a=effective membrane surface area
  $d_p$=diameter of the particle
  "Nominal diameter," as used herein, is the diameter of a particle as determined by photon correlation spectroscopy (PCS), laser diffraction or optical microscopy. Typically, the calculated diameter, or nominal diameter, is expressed as the diameter of a sphere that has the same projected area as the projected image of the particle. PCS, laser diffraction and optical microscopy techniques are well-known in the art. See, for example, Jillavenkatesa, A., et al.; "Particle Size Characterization;" NIST Recommended Practice Guide; National Institute of Standards and Technology Special Publication 960-1; January 2001.

"Flow" Test Using Isopropanol

Isopropanol permeability ("flow") can be determined using an internal flow test. The membrane is placed in a holder with the first side on the upstream. Isopropanol is fed through the sample at a specified pressure, i.e., 14.2 psi, for a predetermined interval at a temperature of 22° C. Then, the isopropanol flowing through the membrane is collected and measured. Isopropanol permeability is calculated from the following equation $$P = \frac{V}{t \times a \times p}$$

where
V=volume of isopropanol collected
t=time of collection
a=effective membrane surface area
p=pressure drop across the membrane As shown by the performance data, the inventive examples exhibit improved filtering performance relative to the commercially available comparative filters.

In a first aspect, a liquid-flowable porous filter membrane comprises polyethylene having two opposed sides and a thickness between the two opposed sides, with pores throughout the thickness, and with the pores having an asymmetric pore structure.

A second aspect according to the first aspect, wherein the polyethylene has a molecular weight of at least 50,000 grams per mole.

A third aspect according to the first aspect or second aspect, comprising smaller pores on a first side and larger pores on a second side, wherein a 1 microliter (1 µL) drop of mineral oil placed on the first side spreads to a diameter of 1 centimeter in a time that is at least 4 times longer than a time for a drop of the mineral oil placed on the second side to spread to a diameter of 1 centimeter.

A fourth aspect according to any of the previous aspects, wherein the polyethylene has a density in a range from about 0.94 to about 0.97 gram per cubic centimeter.

A fifth aspect according to any of the previous aspects, wherein the polyethylene has a melt index in a range from 0.01 to 0.35 grams per 10 minutes as measured using ASTM D1238-13.

A sixth aspect according to any of the previous aspects, comprising smaller pores on a first side and larger pores on a second side and having a mean bubble point in a range from 135 to 185 psi, measured using HFE-7200 liquid fluid at a temperature of 25 degrees Celsius with air flowing from the second side to the first side.

A seventh aspect according to any of the previous aspects, having pores on the first side of the membrane that have an average pore size in a range from 0.001 to 0.2 microns.

An eighth aspect according to any of the previous aspects, having a retention of at least 95 percent, measured based on a 1 percent monolayer using G25 round polystyrene particles having a nominal diameter of 0.03 microns.

A ninth aspect according to any of the previous aspects, having an isopropyl alcohol permeability of at least 50 liters/square meter/hour/bar.

A tenth aspect according to any of the previous aspects, wherein the porous filter membrane has a porosity of at least 60 percent.

An eleventh aspect according to any of the previous aspects, wherein the porous filter membrane has a thickness in a range from 30 to 200 microns.

A twelfth aspect according to any of the previous aspects, wherein the filter membrane is prepared by melt casting.

In a thirteenth aspect, a filter cartridge comprises the membrane of any of the first through twelfth aspects.

In a fourteenth aspect, a filter comprises the membrane of any of the first through twelfth aspects.

In a fifteenth aspect, a method of using a filter membrane of any of the first through twelfth aspects, the filter cartridge of the thirteenth aspect, or the filter of the fourteenth aspect, the method comprising passing solvent-containing liquid through the filter membrane.

A sixteenth aspect according the fifteenth aspect, wherein:
the liquid comprises: ethyl lactate, gamma-butyrolactone, hexamethyldisilazane, methyl-2-hydroxyisobutyrate, methyl isobutyl carbinol, n-butyl acetate, tetraethyl ammonium hydroxide (TMAH), propylene glycol methyl ether (PGME), propylene glycol methylether acetate (PGMEA), isoamyl acetate, 2-heptanone, or cyclohexanone,
the method includes using the filter to remove metal from the liquid.

A seventeenth aspect according to the sixteenth aspect, wherein the filter membrane has a retention of at least 95 percent measured based on a 1 percent monolayer using G25 round polystyrene particles having a nominal diameter of 0.03 microns.

In an eighteenth aspect, a method of preparing a porous polyethylene film having two opposed sides and a thickness between the two opposed sides, with pores throughout the thickness, and with the pores having an asymmetric pore structure, the method comprising:
extruding a heated polymer solution comprising polyethylene polymer and solvent, at an extrusion temperature, to form extruded polymer film, and
reducing the temperature of the extruded polymer film to form the cast porous polyethylene film.

A nineteenth aspect according to the eighteenth aspect, wherein the polymer solution comprises:
from 15 to 35 weight percent polyethylene polymer, and
from 65 to 85 weight percent solvent,
based on total weight polymer solution.

A twentieth aspect according to the eighteenth aspect, wherein the polymer solution comprises:
from 17 to 25 weight percent polyethylene polymer, and
from 75 to 83 weight percent solvent,
based on total weight polymer solution.

A twenty-first aspect according to any of the eighteenth through twentieth aspects, wherein the solvent comprises a strong solvent in which the polyethylene polymer is soluble, at the extrusion temperature, and a weak solvent in which the polyethylene polymer is less soluble, at the extrusion temperature.

A twenty-second aspect according to the twenty-first aspect, wherein:
the strong solvent comprises mineral oil, and
the weak solvent comprises dioctyl phthalate, dibutyl sebacate, or a combination thereof.

A twenty-third aspect according to any of the eighteenth through twenty-second aspects, wherein the polyethylene has a molecular weight of at least 50,000 grams per mole.

A twenty-fourth aspect according to any of the eighteenth through twenty-third aspects, wherein the cast porous polyethylene film comprising smaller pores on a first side and larger pores on a second side, wherein a 1 microliter (1 µL) drop of mineral oil placed on the first side spreads to a diameter of 1 centimeter in a time that is at least 4 times longer than a time for a drop of the mineral oil placed on the second side to spread to a diameter of 1 centimeter.

A twenty-fifth aspect according to any of the eighteenth through twenty-fourth aspects, wherein the polyethylene has a density in a range from about 0.94 to about 0.97 gram per cubic centimeter.

The invention claimed is:

1. A method of preparing a porous high density polyethylene film comprising:
    extruding a heated polymer solution consisting essentially of high density polyethylene polymer and solvent, at an extrusion temperature, to form extruded polymer film in the form of a sheet, and
    reducing the temperature of the extruded polymer film to form the porous high density polyethylene film;
    wherein the solvent comprises a strong solvent in which the polyethylene polymer is soluble at the extrusion temperature, and a weak solvent in which the high density polyethylene polymer is less soluble at the extrusion temperature;
    the porous high density polyethylene film being a single layer having two opposed sides and a thickness between the two opposed sides, with pores throughout the thickness, and with the pores having an asymmetric pore structure.

2. The method of claim 1, wherein the polymer solution comprises: from 15 to 35 weight percent high density polyethylene polymer, and from 65 to 85 weight percent solvent, based on total weight polymer solution.

3. The method of claim 1, wherein the polymer solution comprises: from 17 to 25 weight percent high density polyethylene polymer, and from 75 to 83 weight percent solvent, based on total weight polymer solution.

4. The method of claim 1, wherein: the strong solvent comprises mineral oil, and the weak solvent comprises dioctyl phthalate, dibutyl sebacate, or a combination thereof.

5. The method of claim 1, wherein the high density polyethylene has a molecular weight in a range from 50,000 grams per mole to 3,000,000 grams per mole.

6. The method of claim 1, wherein the porous high density polyethylene film comprising smaller pores on a first side and larger pores on a second side, wherein a 1 microliter (1 µL) drop of mineral oil placed on the first side spreads to a diameter of 1 centimeter in a time that is at least 4 times longer than a time for a drop of the mineral oil placed on the second side to spread to a diameter of 1 centimeter.

7. The method of claim 1, wherein the high density polyethylene has a density in a range from about 0.94 to about 0.97 gram per cubic centimeter.

8. A membrane prepared according to the method of claim 1.

* * * * *